Nov. 9, 1971 — P. MARTIROS — 3,618,271
MULTIFOCAL LENS MANUFACTURING PROCESS AND APPARATUS
Filed Sept. 15, 1969 — 3 Sheets-Sheet 1

INVENTOR.
PAUL MARTIROS
BY Noble S. Williams
ATTORNEY

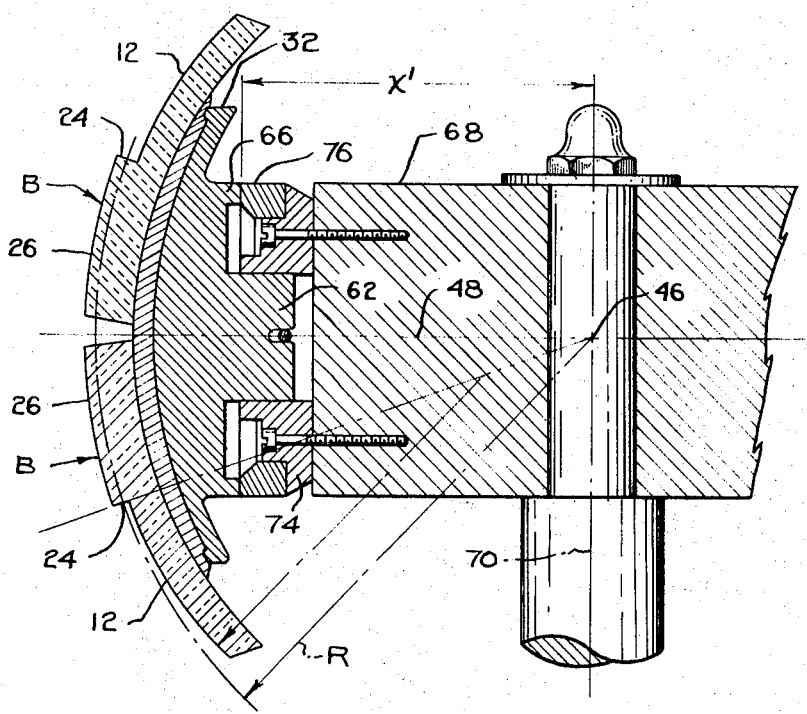
Fig. 7
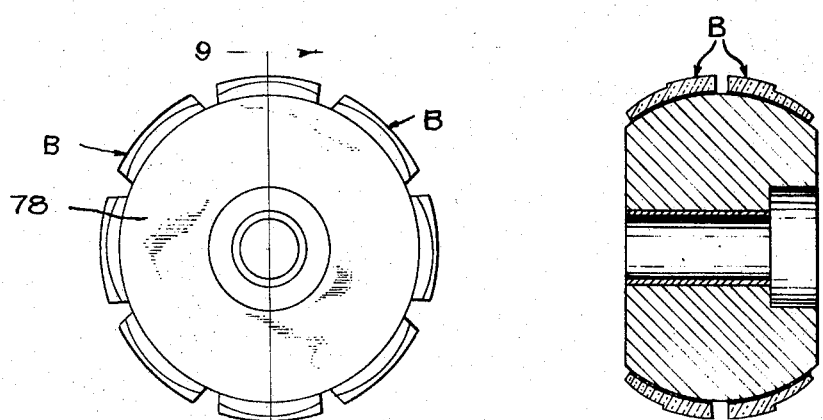
Fig. 8
Fig. 9
INVENTOR.
PAUL MARTIROS
ATTORNEY

United States Patent Office

3,618,271
Patented Nov. 9, 1971

3,618,271
MULTIFOCAL LENS MANUFACTURING PROCESS AND APPARATUS
Paul Martiros, Cherry Valley, Mass., assignor to American Optical Corporation, Southbridge, Mass.
Filed Sept. 15, 1969, Ser. No. 857,784
Int. Cl. B24b 19/00
U.S. Cl. 51—277         15 Claims

ABSTRACT OF THE DISCLOSURE

Multifocal lenses formed of one-piece molded or pressed meniscus lens blanks. An optically finished surface of a curvature desired for near-vision fields of the lenses is produced on a substantial portion of one unfinished side of each of a number of the blanks with a straight cliff-like line of division separating the optically finished and unfinished portions of said sides of the blanks. With referencing from the finished portions of the blanks, they are multiply blocked and revolved about an axis radially spaced from their finished portions a distance equal to a radius of curvature desired upon the unfinished portions less an amount equal to a practical minimum of height to which the cliff-like lines of division are to be reduced. Grinding and polishing to the minimum height of the lines of division during such revolution finishes the blanks. Blocking is performed with an aligning and holding fixture wherein the blanks are supported by their near-vision fields.

BACKGROUND OF THE INVENTION

Field of the invention

Lens manufacturing method and apparatus with particular reference to the making of one-piece multifocal lenses having straight cliff-like lines of division between their respective focal fields.

Description of the prior art

In the manufacture of one-piece multifocal lenses of the type having a straight cliff-like line of division between their focal fields, there are major problems in achieving and maintaining a practical minimum height and clean cut of the cliff edge between focal fields with precision in alignment of centers of curvature of the focal fields.

Prior art multiple lens generating techniques dealing with these and related problems in ways such as are disclosed in exemplary U.S. Pats. Nos. 2,890,551; 2,932,925; 2,966,767; and 2,994,166, have met with success but are not without room for improvement.

In the latter respect, current demands for increased production at lower manufacturing cost impose a need to reduce the number of operations and to simplify the processing in general of one piece multifocal lenses.

It is in this connection that the present invention relates more particularly to a novel, simplified multiple lens manufacturing process uniquely providing exceptional precision in alignment of centers of focal fields and height of cliff edge therebetween with a minimum of operations.

SUMMARY OF THE INVENTION

The present invention relates to a process for producing finished near-vision fields of one-piece multifocal lenses directly upon portions of cast, molded or pressed lens blanks and thereafter utilizing the surfaces of the finished near-vision fields as references for blocking the blanks in a manner assuring precise control of the height and quality of cliff edge produced between the near and far-vision fields during the finishing of remaining portions of the blanks to curvatures desired of the far-vision fields.

It is pointed out that while cast, molded or pressed lens blanks are mentioned as directly receiving the finished near-vision fields, lens blanks initially having other types of surfaces such as rough ground or otherwise semi-finished or even optically finished surfaces may be used in the present process if desired. However, it is intended that processing of the surfaces of lens blanks prior to the forming of their near-vision fields be eliminated. Accordingly, the type of lens blank surfaces worked upon will be referred to hereinafter as "unfinished surfaces" with particular reference being made to the type of surface found on cast, molded or pressed lens blanks.

The lens blanks are first blocked upon a wheel-type block or on adaptors detachably connected or connectable to a wheel-type holder with their unfinished surfaces radially spaced from the axis of the block or holder a distance equal to a radius of near-vision field curvature to be produced thereon plus an amount allowing for adequate subsequent removal of surface material in the forming and finishing of far-vision fields without reducing the height of cliff edge between the near and far fields to less than a practical minimum.

Following such blocking, the near-vision fields are ground and polished to their radius of spherical curvature in the usual manner whereby a cliff-like edge is formed between the near field and unfinished portions of the blanks to a height substantially greater than the ultimate practical minimum.

The blanks, with finished near-vision fields, are deblocked and reblocked in one or more rows about another wheel-type block or preferably on adaptors detachably connected or connectable to a wheel-type holder. The reblocking is performed by placing the blanks in an aligning fixture wherein their finished near-vision fields are positioned and held against aligning means in the fixture. The wheel block or adaptor applied to the lenses is so positioned relative to the aligning means as to locate the near-vision field of the lenses at a predetermined precise distance from the axis of the wheel block or holder when the adaptors are applied thereto. This distance is equal to the radius of curvature of far-vision fields to be formed on unfinished portions of the blanks less an amount equal to the practical minimum height to which the cliff edges are to be formed by finishing of the far-vision fields. At the same time, orientation of the near-vision fields of the blanks in the fixture is such that, upon finishing of the far-vision fields, centers of curvature of the near and far-vision fields of each lens blank will lie upon a common axis.

Finishing of the far-vision fields and cliff edges is accomplished by rotation of the wheel block or adaptor-holder combination about its axis with grinding and polishing of unfinished portions of the blanks in the usual manner.

Aligning and referencing from finished near-vision portions of the lens blanks for the finishing of far-vision portions thereof uniquely affords precise control of relative positions of near and far field curvatures, control of prism between near and far fields, height of cliff edge therebetween and eliminates prior art operations of preparing unfinished sides of lens blanks for reception of their finished near and far fields.

Deblocking of the blanks and finishing of their opposite sides to prescriptive curvatures completes the lenses.

The present invention will be more fully understood by reference to the following detailed description and the accompanying drawing.

DESCRIPTION OF THE DRAWING

FIG. 7 is a fragmentary cross-sectional view of a pair of blocked lens blanks associated with holding means employed in surface finishing operations performed upon the blanks;

FIG. 8 is a side elevational view of an alternative form of lens blank holding means; and FIG. 9 is a cross-sectional view taken along line 9—9 of FIG. 8.

DESCRIPTION OF THE PREFERRED EMBODIMENTS

Figure 1:
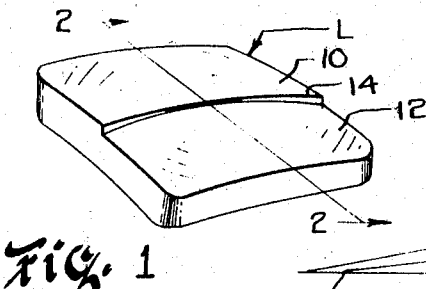
FIG. 1 is a perspective view of a multifocal lens which is exemplary of the type of lenses to which the present invention is applicable.
Figure 2:
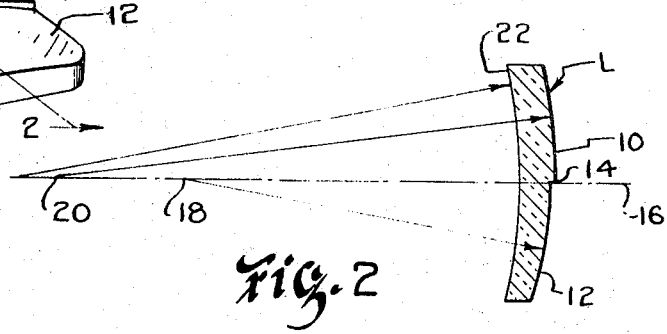
FIG. 2 is a cross-sectional view taken generally along line 2—2 of FIG. 1.

Referring more particularly to FIGS. 1 and 2, lens L is exemplary of the type of multifocal lens intended to be produced according to the principles of this invention.

Lens L comprises a single piece of lens medium, e.g. optical crown glass, having a far-vision field or distance portion 10 and a near-vision field or reading portion 12. These portions are separated by a straight dividing line 14 which is of cliff-like configuration having a practical minimum height of, for example, less than .300 millimeter at one point along line 14 and reaching greater heights at opposite sides of the lens by amounts according to differences in radii of curvature of the distance and reading portions and width of the lens.

Referring more particularly to FIG. 2 wherein dot-dash line 16 represents the optical axis of lens L it will be noted that the center of curvature 18 of reading portion 12 and the center of curvature 20 of distance portion 10 are monoaxial. Lens L is finished by providing its opposite side 22 with a surface shape which, when combined with the curvatures of distance and reading portions 10 and 12 will provide the required prescriptive powers for far and near viewing respectively; the depth to which surface 22 is formed also being controlled according to prescriptive requirements of the lens.

The term "multifocal" as used herein is intended to refer to lenses or lens blanks having two or more focal fields. The following description, however, will deal more particularly with the manufacture of bifocal lenses, i.e. the type having only two focal fields such as have been illustrated in FIGS. 1 and 2. Nevertheless, it will become apparent that lenses having more than two focal fields may be produced according to principles of this invention.

Figure 3:
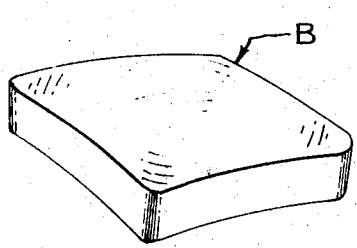
FIG. 3 is a perspective illustration of an unfinished lens blank.
Figure 4:
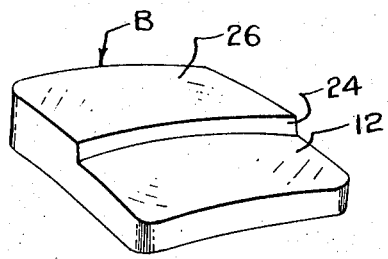
FIG. 4 is a perspective illustration of a partially finished multifocal lens blank.

In order to minimize the number of operations involved in producing lenses of the aforementioned type, it is preferable to select a number of cast, molded or pressed meniscus lens blanks such as lens blank B (FIG. 3) and to form directly upon one unfinished side of such blanks an optically finished surface of the size and curvature desired of reading portion 12 (FIG. 4). In so doing, reading portion 12 is finished to a depth in each of the blanks sufficient to produce a cliff-edge 24 between reading portion 12 and the remaining unfinished portion 26 which is of a height considerably greater than dividing line 14 so as to allow for removal of enough material from portion 26 to permit the forming of distance portion 10 thereon.

Notwithstanding the practicality of using blanks which are meniscus and have surface curvatures approximately those desired of the viewing fields of least power to be produced thereon, the blanks may be flat and of any suitable size, shape and thickness.

The forming of finished portions 12 on each of the preselected number of lens blanks B may be accomplished in any practical manner such as for example in the way shown and described in U.S. Pat. No. 2,966,767.

Beginning with a preselected number of lens blanks B each having a finished reading portion 12, cliff-edge 24 and unfinished portion 26 (FIG. 4), finishing of portion 26 of each blank according to principles of this invention is accomplished as follows:

The blanks B are attached to a wheel-type holder in at least one row extending about the axis of the holder with finished reading portions 12 thereof all radially spaced from the axis of the holder a distance equal to the radius of curvature desired of far-vision or distance portions 10 to be produced on unfinished portions 26, less an amount equal to the practical minimum height desired of cliff-edge 24 which ultimately forms dividing line 14. Additionally, the finished surfaces of reading fields 12 of the blanks B are so oriented relative to each other on the wheel-type holder as to locate their centers of curvature in monoaxial relationship with locations of centers of curvature of respective distance portions 10 which are to be produced on the unfinished portions 26 of the blanks.

According to one aspect of this invention, lens blanks B are first blocked in pairs upon individual adaptors which, when attached to a wheel-type holder, will locate blanks B in the aforesaid positions of orientation relative to each other and radial distances from the axis of the wheel-type holder.

Figure 5:
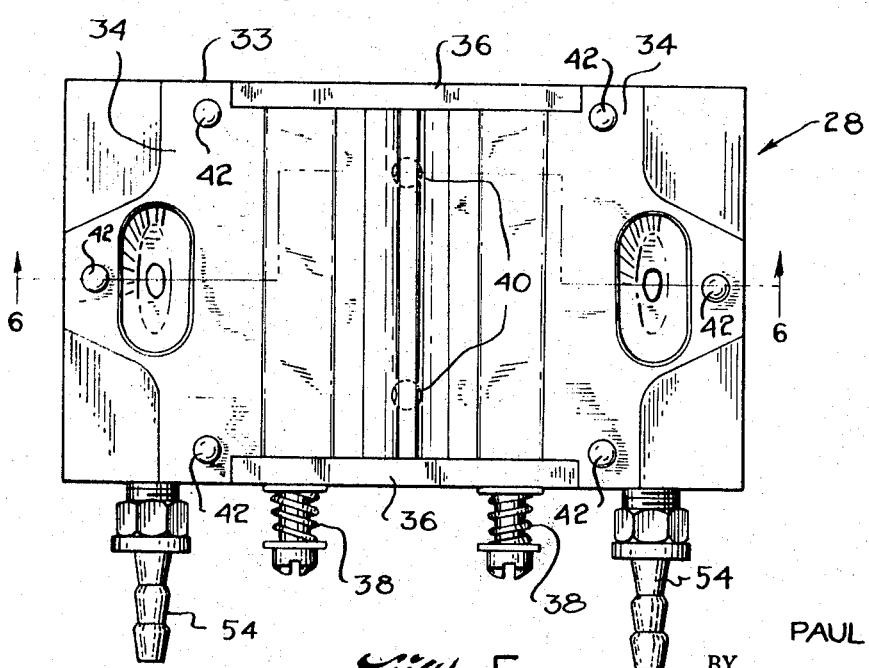
FIG. 5 is a top plan view of a lens blank aligning and holding fixture.
Figure 6:
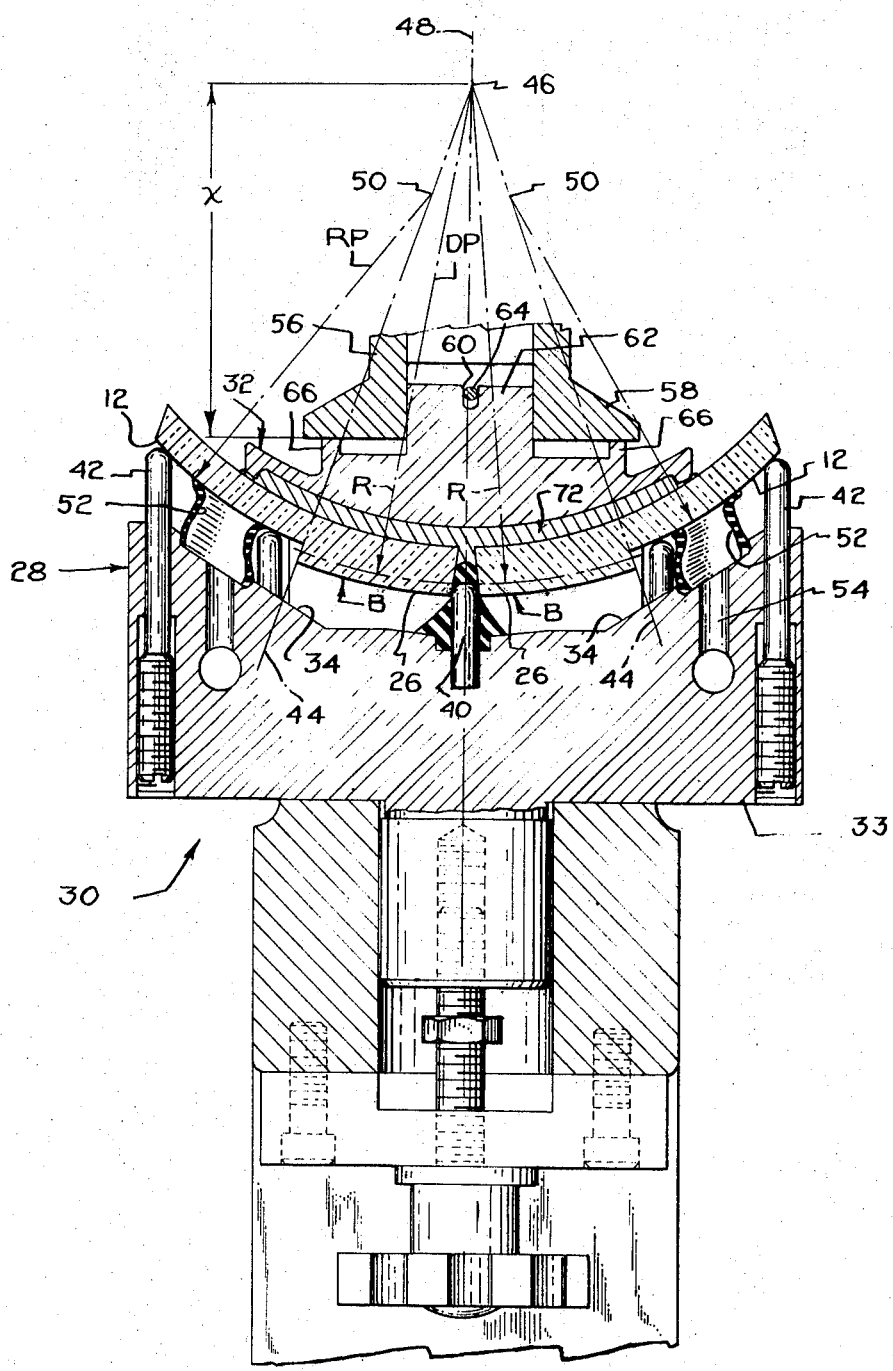
FIG. 6 is a fragmentary, partially cross-sectional front elevational view of a lens blocking unit in which the lens blank aligning and holding fixture of FIG. 5 is incorporated, the cross section through the fixture being taken generally along line 6—6 of FIG. 5.

With particular reference being made to FIGS. 5, 6 and 7 it can be ceen that lens blanks B are placed in pairs in an aligning and holding fixture 28 of a blocking unit 30 for precision blocking to a lens-holding adaptor 32 in each case.

Aligning and blocking fixture 28 has main body portion 33, the upper surface of which is recessed by inwardly converging opposite end walls 34. A lens receiving cavity is formed between walls 34 through the provision of side plates 36 between which lens blanks B are inserted into fixture 28. At least one of plates 36, being free to move away from the other plate 36 against holding springs 38, compensates for slight variations in widths of blanks B inserted into the fixture cavity. Stop pins 40 disposed centrally with the lens receiving cavity of body portion 33 are abutted by one edge of each of the pair of blanks B inserted into the fixture cavity whereby a user of the fixture may determine that lens blanks B are fully entered into and properly centered within the cavity.

Lens blank aligning and supporting pins 42 in each of end walls 34 respectively receive the optically finished surfaces of reading portions 12 of blanks B wherewith optical axes 44 of the pair of lens blanks B seated against pins 42 are automatically caused to intersect each other at a given point 46 on axis 48 of fixture 28. Thus, optically finished surfaces of reading portions 12 of lens blanks B are automatically located at a distance from point 46 equal to the radius of curvature R intended to be produced upon unfinished portions 26 of blanks B, less the practical minimum height of dividing line 14 when the blanks B are subsequentlly revolved around point 46 for generation of finished distance portions 10 upon unfinished portions 26.

Hollow vacuum cups 52 formed of rubber or a similar pliable material having their interior evacuated of air and gases by vacuum lines 54 built into fixture 28 hold lens blanks B firmly and securely against supporting and aligning pins 40, 42 during blocking of the blanks to adaptor 32.

Blocking unit 30 includes plunger 56 having magnetic chuck 58 which receives and detachably supports adaptor 32. Plunger 56 is movable toward and away from fixture 28 along axis 48 and is raised above fixture 28 in receiving adaptor 32. Key slot 60 in shank 62 of adaptor 32 is fitted over locating pin 64 within chuck 58 whereby the adaptor is automatically properly oriented for reception in fixture 28. At the same time, annular shoulder 66 extending around shank 62 is caused to abut magnetic chuck 58.

Adaptor 32 is lowered toward lens blanks B, by operation plunger 56, to a point where reference shoulder 66 is positioned at an established distance X from the point of intersection 46 of the lens blank axes 44 so that subsequent positioning of blocked lens blanks B upon a wheel-type holder 68 (FIG. 7) with shoulder 66 located at the same distance X' from axis 70 of holder 68 will automatically position finished reading portions 12 of the blanks at the desired radial distance from axis 70 of the holder.

With adaptor 32 so positioned adjacent the rear surfaces of lens blanks B as illustrated in FIG. 6, a blocking medium 72 (e.g. a low melting point metallic alloy, pitch or other adhesive) placed between adaptor 32 and lens blanks B detachably secures the blanks to adaptor 32.

With release of the vacuum in holding cups 52 and raising of plunger 56, the thus blocked lens blanks B are removed from plunger 56 as a unit with adopter 32 and applied to wheel-type holder 68 (FIG. 7) for surfacing of unfinished portions 26 thereof.

Those interested in details of various parts of blocking unit 30 not shown in the present drawing may refer to U.S. Pat. No. 2,994,166 wherein such details are illustrated and described.

Attachment of the blocked unit of lens blanks B to holder 68 (FIG. 7) is effected by entering shank 62 of adaptor 32 into magnetic chuck 74 on holder 68. Chuck 74, being generally similar to magnetic chuck 58, has an annular reference shoulder 76 radially spaced from axis 70 of holder 68 a distance X' which is equal to the distance X between shoulder 66 of adaptor 32 and point 46 on axis 48 of the adaptor. Accordingly, when shoulder 66 of adaptor 32 is received against shoulder 76 of chuck 74 the finished reading portions 12 of blanks B become automatically positioned at a radial distance from axis 70 precisely equal to the radius of curvature desired to be produced on unfinished portions 26 of the blanks for forming distance portions 10 thereof, less an amount equal to the practical minimum height desired of cliff edge 24. Thus, by rotating holder 68 about its axis 70 and grinding and polishing unfinished portions 26 of lens blanks B to the depth and radius of curvature R (FIG. 7) with suitable grinding and polishing tools, distance portions 10 are formed upon blanks B.

It is to be understood that holder 68 (FIG. 7), while illustrated with only one lens block receiving chuck 74, would preferably have a plurality of such chucks about its periphery and a corresponding plurality of blocked units of lens blanks B.

For those interested in details of typical grinding and polishing operations involved in the finishing of unfinished portions 26 of lens blanks B reference may be made to U.S. Pat. No. 2,994,166.

It is also pointed out that lens blanks B may be blocked singularly on adaptors 32 or they may be blocked directly upon the periphery of a more conventional lens holding wheel 78 (FIGS. 8 and 9) in single or double rows. In such a case, block 78 would replace the adaptor 32-holder 68 system of FIG. 7. In the latter instance, a blocking unit similar to that illustrated in FIG. 4 of U.S. Pat. No. 2,966,767 would be employed for the blocking operation with the present lens blank holding an aligning fixture 28 substituted for the holding fixture shown and described in the patent.

In a case where far-vision fields or distance portions of trifocal lens blanks (i.e. lens blanks having optically finished near and intermediate fields) are to be ground and optically polished, pins 42 and vacuum cups 52 would be relocated in fixture 28 so as to receive finished surfaces of the intermediate fields of the trifocal blanks. Otherwise, the technique of blocking trifocal lens blanks according to principles of this invention would be identical to that described hereinabove.

Finished surfaces of lens blanks which engage pins 42 of fixture 28 may be spray coated or painted with an easily removable lacquer or the like for protection against scratching or other abrasion during blocking and subsequent handling. The thickness of such a coating is usually negligible and disregarded in establishing the distance X (FIG. 6) but may be compensated for by adjustment of the height of pins 42 if desired.

What is claimed is:

1. The method of simultaneously producing one-piece multifocal blanks each having at least a pair of optically finished focal fields one separated from another by a straight cliff-like line of division of practical minimum hight, said method comprising the steps of:
    attaching one side of each of a preselcted number of lens blanks having unfinished opposite sides to a first wheel-type holder consecutively about the periphery of the holder;
    rotating the holder about its axis and engaging a substantial portion of exposed unfinished sides of the blanks with first abrading means for grinding spehrically curved near-vision fields into said exposed sides to a depth substantially greater than said minimum height of said lines of division with an edge of said abrading means positioned adjacent the desired locations of said lines of division for producing same;
    grinding said near-vision fields to said depth and optically polishing the surfaces thereof;
    removing said blanks from said first holder for attachment to a second wheel-type holder;
    supporting said removed blanks each by their respective finished near-vision fields for attachment to said second wheel-type holder and attaching a plurality thereof to said second wheel-type holder along at least one row extending about the axis of the second holder with reference being made from said finished surfaces of said near-vision fields for identically radially locating each lens blank with its finished surface ultimately spaced from said axis of said second holder a distance equal to a radius of curvature desired of far-vision fields to be produced on finished portions of said exposed sides of said lens blanks less an amount equal to said minimum height desired of said cliff-like lines of division, said finished near-vision fields further being so oriented as to position centers of curvature thereof in monaxial relationship with respective points of centers of curvature for far-vision fields;
    rotating said second wheel-type holder about its axis and engaging unfinished portions of said blanks with second abrading means for grinding spherically curved far-vision fields thereon;
    grinding said far-vision fields to a depth sufficient to reduce said cliff-like lines of division to said practical minimum height; and
    optically polishing the ground far-vision fields.

2. The method according to claim 1 wherein said lens blanks are attached to said second wheel-type holder in a single row.

3. The method according to claim 1 wherein said lens blanks are attached to said second wheel-type holder in double rows with said unfinished portions of said blanks in respective rows placed in adjacent side-by-side relationship with each other.

4. The method according to claim 1 wherein said lens blanks which are supported by their near-vision fields are blocked upon adaptors attachable to said second wheel-type holder, said adaptors and second holder having cooperatively functioning locating means substantially identically orienting all adaptors relative to the axis of the second holder and automatically locating same at fixed identical radial distances from said holder axis when said adaptors are applied thereto.

5. The method according to claim 4 wherein reference is made from the finished surfaces of said near-vision fields relative to said locating means on said adaptors during said blocking of said lens blanks for placing said near-vision fields of said lens blanks at said identically radially spaced distance from said axis of said second holder and in monaxial relationship with centers of curvature of respective far-vision fields to be formed thereon when said adaptors are applied to said holder.

6. The method according to claim 5 wherein said lens blanks are blocked in pairs on each of said adaptors with corresponding unfinished portions thereof positioned in side-by-side relationship with each other.

7. The method of simultaneously finishing a multiplicity of one-piece multifocal lens blanks each having an optically finished near-vision field and an unfinished raised portion on one side thereof, the finished field and raised portion being separated by a straight cliff-like line of division;
said method comprising the steps of:
blocking said lens blanks upon adaptors attachable to a wheel-type holder, said adaptors and holder having cooperatively functioning locating means substantially orienting all adaptors relative to the axis of said holder and automatically locating same at fixed identical radial distances from said holder axis once said adaptors are applied to the holder;
attaching a number of said adaptors to said wheel-type holder in at least one row extending about the axis of said holder a distance equal to a radius of curvature desired of far-vision fields to be produced on said unfinished portions of said blanks less an amount equal to a minimum height desired of said cliff-like lines of division upon completion of said lens blanks, said adaptors further being so oriented as to position centers of curvature of said finished near-vision fields of said lens blanks in monaxial relationship with points of centers of curvature for said respective far-vision fields of said lens blanks;
rotating said wheel-type holder about its axis and engaging said unfinished portions of said blanks with abrading means for grinding said far-vision fields thereon;
grinding said far-vision fields to a depth in said unfinished portions sufficient to reduce said cliff-like lines of division to said minimum height; and
optically polishing the generated far-vision fields to complete said blanks.

8. The method according to claim 7 wherein said lens blanks are attached to said wheel-type holder in a single row.

9. The method according to claim 7 wherein said lens blanks are attached to said wheel-type holder in double rows with said unfinished raised portions of said blanks in respective rows thereof positioned in adjacent side-by-side relationship with each other.

10. The method according to claim 7 wherein reference is made from the finished surfaces of said near-vision fields relative to said locating means on said adaptors during said blocking of said lens blanks for positioning said near-vision fields of said blanks at said identically radially spaced distance from said axis of said holder and in monaxial relationship with centers of curvature of respective far-vision fields to be formed thereon once said adaptors are applied to said holder.

11. The method according to claim 10 wherein said lens blanks are blocked in pairs on each of said adaptors with corresponding unfinished portions thereof positioned in side-by-side relationship with each other.

12. An aligning and holding fixture for use in blocking one-piece multifocal lens blanks, each having an optically finished focal field portion and an unfinished focal field portion on one side thereof, said fixture comprising:
a main body section having a lens blank receiving cavity, said cavity having at least one inwardly directed inclined side wall;
a group of lens blank supporting and aligning pins extending into said cavity through said wall against which a finished focal field surface of one of said blanks may be positioned for effecting alignment of said blank in said fixture with the unfinished focal field of the blank suspended inwardly of the cavity;
a vacuum cup intermediately of said group of pins adapted to be engaged by said finished focal field surface of said lens blank when said surface is positioned against said pins; and
means for evacuating air and gases from said cup for holding said lens blank firmly against said pins during blocking thereof.

13. An aligning and holding fixture according to claim 12 wherein said cavity has a pair of oppositely disposed inwardly inclined side walls, respectively oppositely disposed groups of said supporting and aligning pins extending into said lens blank receiving cavity through each of said walls, and a vacuum cup intermediately of each of said groups of said pins whereby a pair of said lens blanks positioned in said cavity with unfinished focal fields thereof directed toward each other may be aligned and supported by their respective finished focal fields.

14. An aligning fixture according to claim 12 wherein each of said supporting and aligning pins is individually longitudinally adjustable in said main body section to accommodate for positional alignment of lens blanks having finished focal fields of various different surface curvatures.

15. An aligning fixture according to claim 12 further including a pair of side plates on said main body section between which said lens blanks are centered when positioned in said lens receiving cavity, at least one of said plates being adjustable toward and away from the other of said plates according to variations occurring in width dimensions of said lens blanks.

References Cited

UNITED STATES PATENTS

| 2,310,925 | 2/1943 | Bardwell | 51—284 |
| 2,847,804 | 8/1958 | Calkins | 51—284 |
| 2,890,551 | 6/1959 | Dalton | 51—284 |
| 2,932,925 | 4/1960 | Dalton | 51—277 |
| 2,966,767 | 1/1961 | Kress | 51—284 |
| 2,994,166 | 8/1961 | Bardwell | 51—284 |
| 3,066,458 | 12/1962 | Catron | 51—284 |

WILLIAM R. ARMSTRONG, Primary Examiner

U.S. Cl. X.R.

51—216 LP, 284